(12) United States Patent
Hall et al.

(10) Patent No.: US 10,174,633 B2
(45) Date of Patent: Jan. 8, 2019

(54) CONTAINMENT HOOK FOR COMPOSITE FAN CASE

(71) Applicant: ROLLS-ROYCE CORPORATION, Indianapolis, IN (US)

(72) Inventors: Christopher Hall, Indianapolis, IN (US); Benedict N. Hodgson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 430 days.

(21) Appl. No.: 14/928,322

(22) Filed: Oct. 30, 2015

(65) Prior Publication Data

US 2017/0122126 A1    May 4, 2017

(51) Int. Cl.
| | | |
|---|---|---|
| *F01D 21/04* | (2006.01) | |
| *F01D 25/28* | (2006.01) | |
| *F02C 7/045* | (2006.01) | |
| *B64D 33/02* | (2006.01) | |
| *F02C 7/04* | (2006.01) | |
| *F01D 5/28* | (2006.01) | |
| *F01D 25/24* | (2006.01) | |

(52) U.S. Cl.
CPC ........... *F01D 21/045* (2013.01); *B64D 33/02* (2013.01); *F01D 5/282* (2013.01); *F01D 25/24* (2013.01); *F01D 25/28* (2013.01); *F02C 7/04* (2013.01); *F02C 7/045* (2013.01); *F05D 2240/14* (2013.01); *Y02T 50/672* (2013.01)

(58) Field of Classification Search
CPC ........ F01D 21/045; F01D 25/24; F01D 5/282; F01D 25/28; F05D 2240/14; F02C 7/04; F02C 7/045
See application file for complete search history.

(56) References Cited

U.S. PATENT DOCUMENTS

| | | | |
|---|---|---|---|
| 6,814,541 B2 | 11/2004 | Evans et al. | |
| 7,402,022 B2 * | 7/2008 | Harper | .................. F01D 21/045 |
| | | | 415/214.1 |
| 8,028,802 B2 | 10/2011 | Durchholz et al. | |
| 8,202,041 B2 | 6/2012 | Wojtyczka et al. | |
| 8,333,558 B2 | 12/2012 | Finn et al. | |

(Continued)

FOREIGN PATENT DOCUMENTS

| | | |
|---|---|---|
| EP | 1566523 | 8/2005 |
| EP | 2305985 | 4/2011 |

(Continued)

OTHER PUBLICATIONS

Extended European Search Report dated Apr. 7, 2017, for European Patent Application 16193991.3, Applicant, Rolls-Royce Corporation (10 pages).

*Primary Examiner* — Carlos A Rivera
*Assistant Examiner* — Danielle M. Christensen
(74) *Attorney, Agent, or Firm* — McCracken & Gillen LLC

(57) ABSTRACT

According to one aspect, a fan blade containment apparatus for turbofan engines includes a containment hook and a fan case barrel. The containment hook and the fan case barrel are formed from composite materials, and the containment hook is attached to the fan case barrel such that the containment hook contains forward motion of a fan blade during a fan blade off event. The apparatus further includes the containment hook being arranged to shorten the axial length of the fan case barrel.

16 Claims, 5 Drawing Sheets

(56) References Cited

U.S. PATENT DOCUMENTS

| | | | |
|---|---|---|---|
| 8,403,624 | B2 | 3/2013 | Xie et al. |
| 8,672,609 | B2 | 3/2014 | Lussier et al. |
| 8,747,586 | B2 | 6/2014 | Collins et al. |
| 8,757,958 | B2 | 6/2014 | Lussier |
| 2004/0031878 | A1* | 2/2004 | Linton ............... B64D 15/04 244/10 |
| 2014/0086734 | A1 | 3/2014 | Xie |

FOREIGN PATENT DOCUMENTS

| | | |
|---|---|---|
| EP | 2290199 | 10/2012 |
| EP | 2767676 | 8/2014 |
| GB | 2501918 | 11/2013 |

* cited by examiner

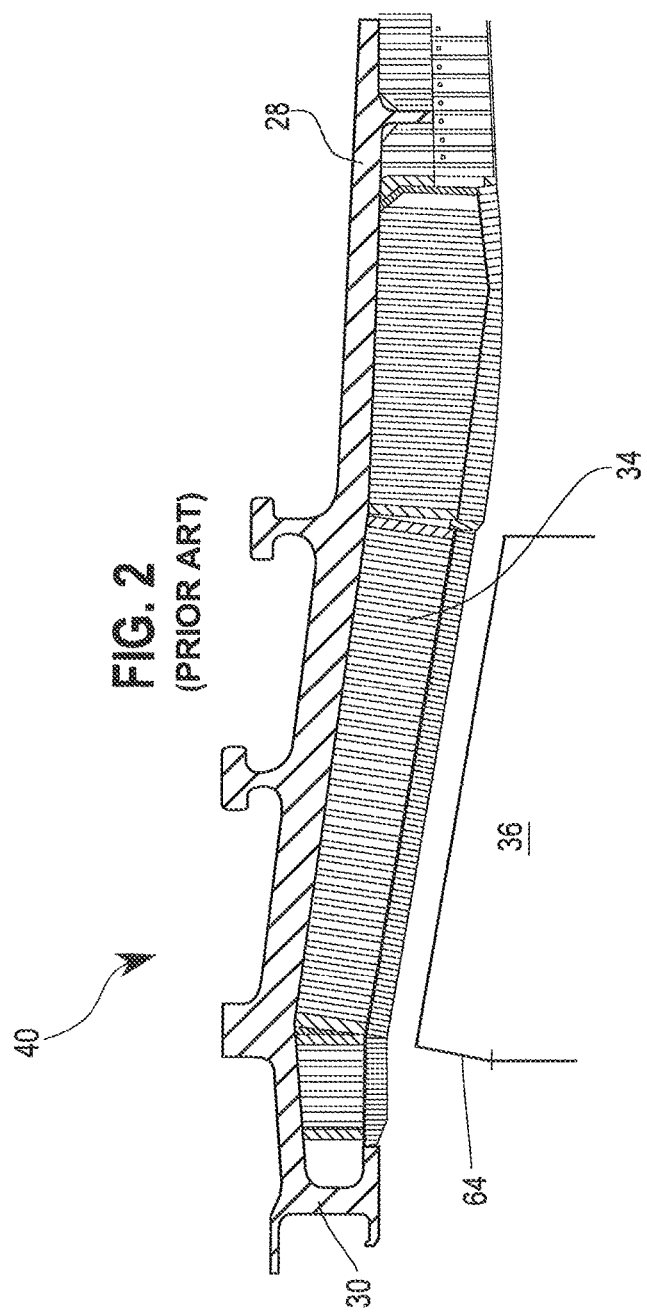

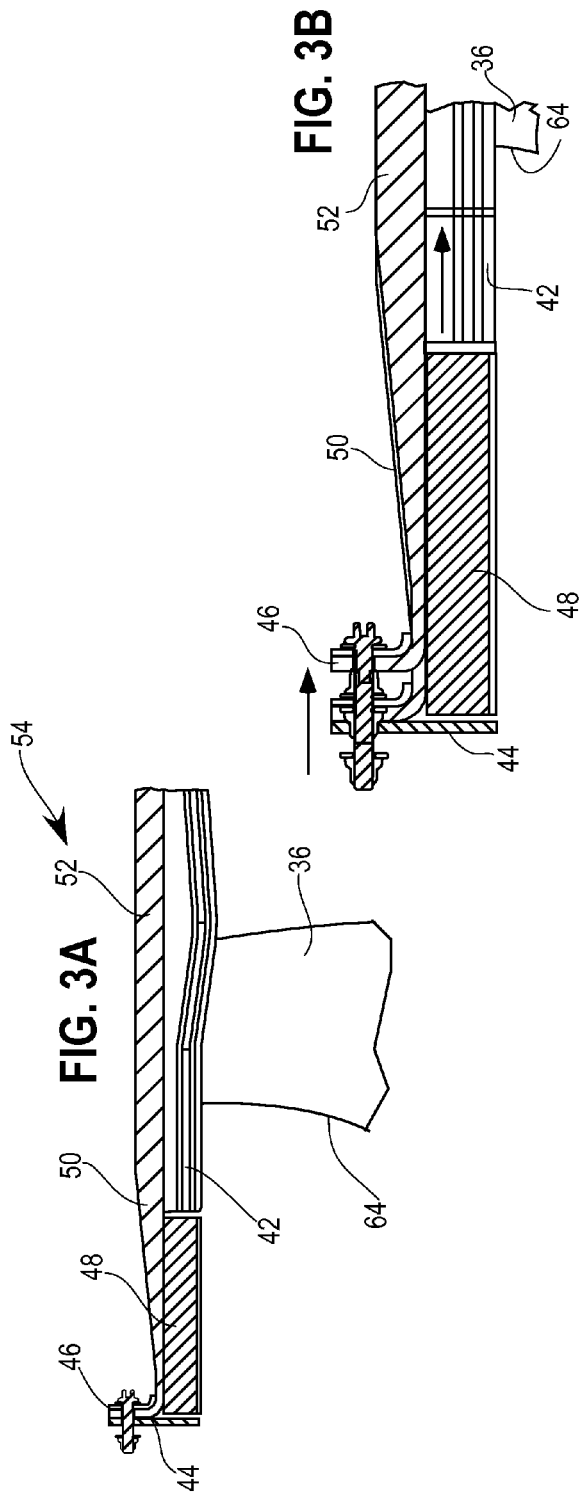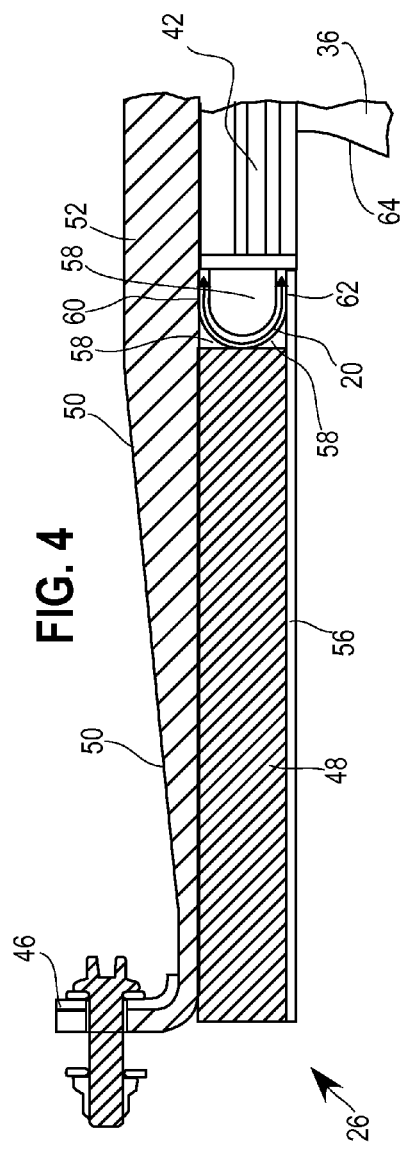

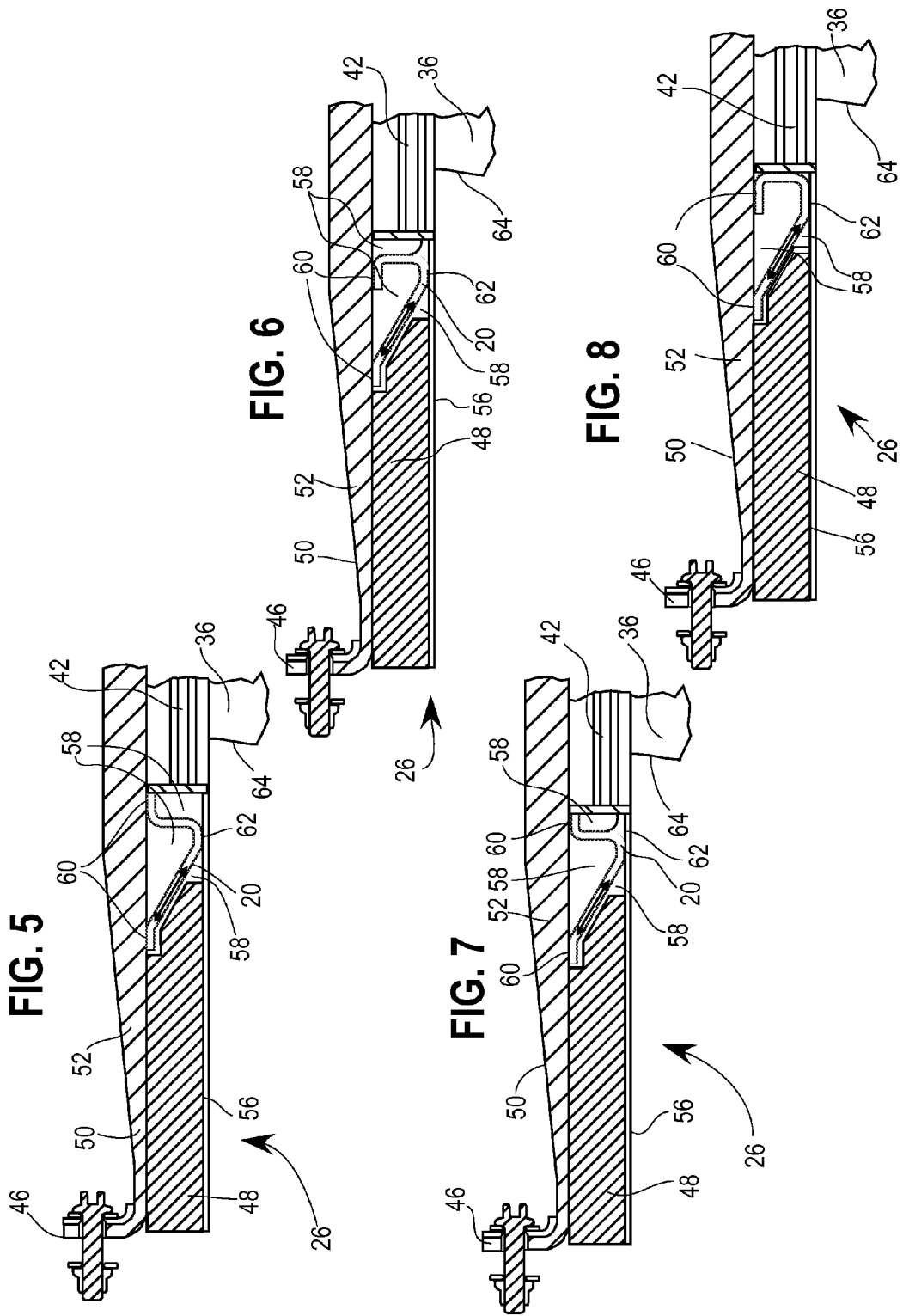

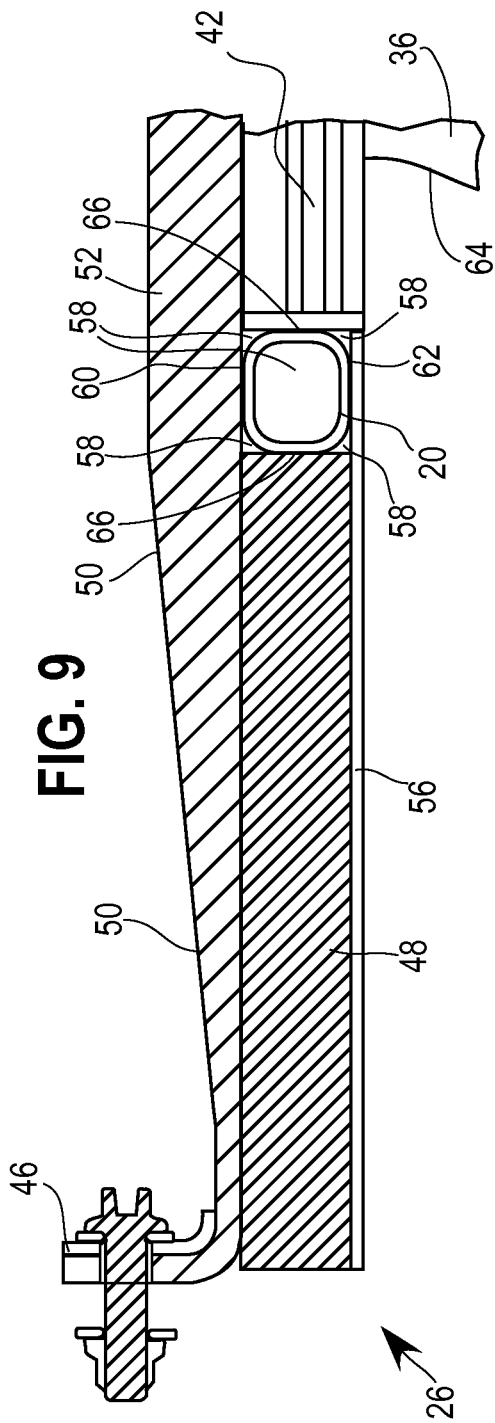

US 10,174,633 B2

CONTAINMENT HOOK FOR COMPOSITE FAN CASE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to engines, and more particularly, to cases for turbofan engines.

BACKGROUND

Turbofan engines are frequently employed in aviation. In order for a turbofan engine to be effective in an aviation application, it is typically placed close to other critical portions of an aircraft. For example, a turbofan engine may be mounted on a wing thus placing the turbofan engine in close proximity with both the wing and the fuselage of the aircraft. Therefore, operation of such a turbofan engine must meet certain safety standards.

Safety standards and precautions for turbofan engines are important during all phases of operation, including start-up, shutdown, normal operation, and failure. Safety may be of particular concern during failure of the engine, especially when failure involves the fan itself. One type of failure condition is known as "fan blade off." "Fan blade off" refers to separation of a fan blade from the turbofan shaft. During a fan blade off event, a case housing the turbofan engine is expected to prevent the fan blade from travelling along a path that damages the wing or fuselage.

Referring now to the prior art design shown in FIG. 2, a metal hardwall case 40 may be made of titanium and include a metal/titanium barrel 28. A typical titanium hardwall case 40 design may include a metal containment hook feature 30 machined as part of the metal fan case barrel 28. The integral metal hook feature 30 is manufactured at the same time as the metal fan case barrel and is integral to said metal fan case barrel 28, as seen in FIG. 2. A fan track liner 34, traditionally made of metal honeycomb, lines the metal fan case. The fan blade(s) 36 are secured to a shaft during normal operation. Upon separation from the shaft, the fan blade 36 strikes the metal hardwall case 40.

During the fan blade off event, the fan blade travels in both a radial/circumferential and possibly axial direction away from the turbofan shaft. This movement results in the fan blade 36 moving out towards the metal fan case barrel 28 and forward in relation to the turbofan engine. It is an objective of the metal hardwall case 40 to prevent the fan blade 36 from escaping the metal fan case 40. The fan blade 36 escaping from the fan case 40 is a safety hazard and may result in damage to the fuselage or wing caused by an impact from the escaped fan blade 36.

As an alternative to the integral hook machined into the metal fan case barrel, a composite fan case may be elongated and include at the termination of the elongated case a debris fence that assists in containing a separated fan blade during a fan blade off event. Elongating the fan case requires additional material and additional weight. A need exists for a turbofan engine casing that uses composite materials, provides containment of a separated fan blade, and achieves weight reduction.

SUMMARY

According to one aspect, a fan blade containment apparatus for turbofan engines includes a containment hook and a fan case barrel. The containment hook and the fan case barrel are formed from composite materials, and the containment hook is attached to the fan case barrel such that the containment hook contains forward motion of a fan blade during a fan blade off event. The apparatus further includes the containment hook being arranged to shorten the axial length of the fan case barrel.

According to another aspect, a system for fan blade containment for turbofan engines includes a containment hook, a fan case barrel, and a fan track liner. The containment hook and the fan case barrel are formed from composite materials, and the containment hook is attached to the fan case barrel such that the containment hook contains forward axial motion and radial motion of a fan blade during a fan blade off event. The system further includes the containment hook being attached to the fan case barrel such that the fan case barrel and the fan track liner are shortened along an axial length to reduce weight.

Other aspects and advantages will become apparent upon consideration of the following detailed description and the attached drawings wherein like numerals designate like structures throughout the specification.

BRIEF DESCRIPTION OF THE DRAWINGS

FIG. 2 shows a cross-sectional view of a turbofan engine including a fan case;

FIG. 3A shows a cross-section of an elongated composite fan case;

FIG. 3B illustrates the shortened portions of an example composite fan case similar to that of FIG. 3A;

FIG. 4 shows a cross-section of part of a composite fan case having an embodiment of a composite containment hook with a c-channel shape;

FIG. 5 shows a cross-section of part of a composite fan case having an embodiment of a composite containment hook with a shelf shape;

FIG. 6 shows a cross-section of part of a composite fan case having an embodiment of a composite containment hook with a tee shape;

FIG. 7 shows a cross-section of part of a composite fan case having an embodiment of a composite containment hook with a tee plus c-channel shape; and FIG. 8 shows a cross-section of part of a composite fan case having an embodiment of a composite containment hook with a candy cane shape.

FIG. 9 shows a cross-section of part of a composite fan case having an embodiment of a composite containment hook with a square or rectangular shape.

DETAILED DESCRIPTION

Figure 1:
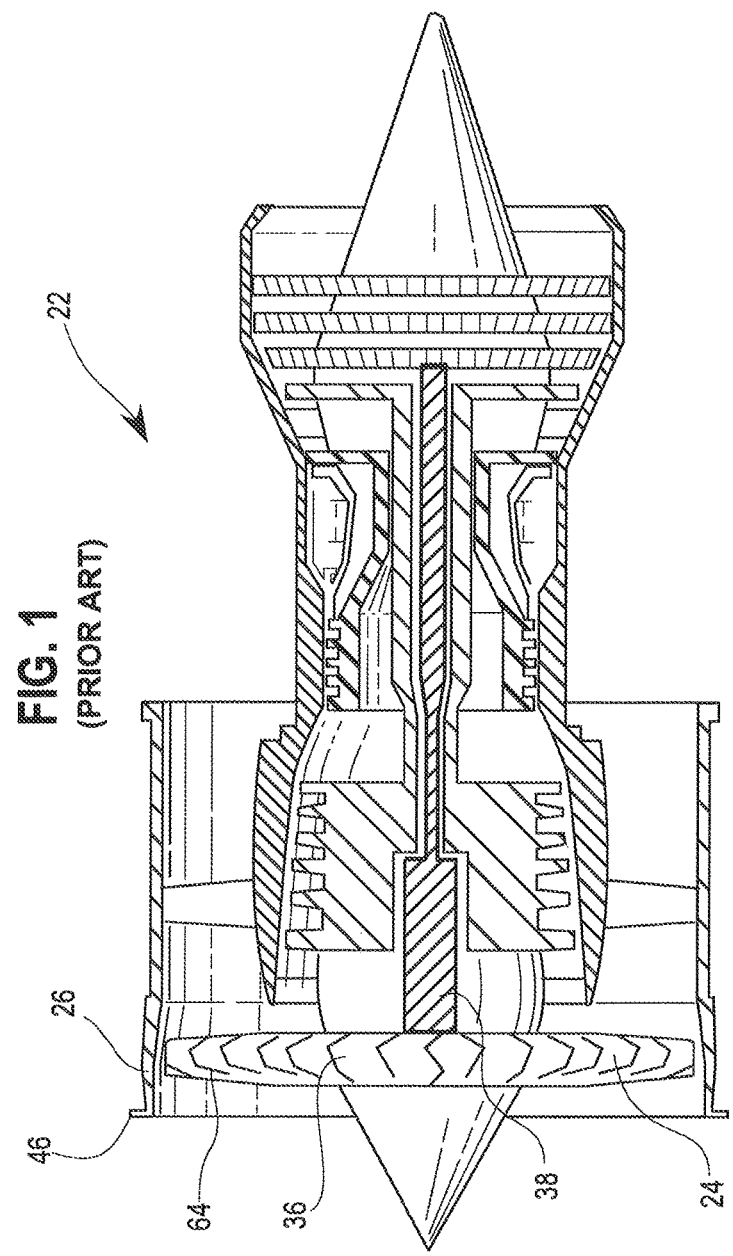
FIG. 1 shows cross-section of a prior art metal fan case.

Referring now to FIG. 1, a turbofan engine 22 is shown with a fan 24 and fan case 26. In an example fan blade off event for composite fan case(s) 26 (composite fan case), 54

(elongated composite fan case), such as that shown in FIGS. 3A, 3B, and 4-8, upon separation from a turbofan shaft 38, a fan blade 36 pierces a fan track liner 42 and strikes a composite fan case barrel 52. During the fan blade off event, the fan blade 36 travels in both an axial and radial direction away from the shaft 38. This movement results in the fan blade 36 moving out through the fan track liner 34 and forward in relation to the turbofan engine 22. It is an objective of the composite fan case(s) 26, 54 to contain the radial and axial movement of the separated fan blade 36 and keep the fan blade 36 from escaping the fan case 26, 54.

Referring to FIG. 3A, an elongated composite fan case 54 is shown. In order to provide the necessary fan blade 36 containment the axial length of the fan case 54 is extended. In addition to elongation of the fan case 54, a debris fence 44 is added at the end of the case 54 for additional containment. A lip 46, referred to herein as A1, assists in the positioning of the debris fence 44 and forms a termination of the fan case 54. As depicted in FIG. 3A, the extended fan case 54 includes a fan track liner 42 and a composite fan case barrel 52. Moving in the axial direction away from the location of the fan blade(s) 36, the fan track liner 42 meets a forward acoustic panel 48. The forward acoustic panel 48 may be produced with a honeycomb design. In the proximity of, but not simultaneous with, the transition from the fan track liner 42 to the forward acoustic panel 48, the fan case barrel 52 forms a ramp 50.

Typically, an objective for use of composites in the manufacture of turbofans and fan cases is reduction in weight. However, elongating the fan case 54 hinders the weight reduction objective. Referring now to FIG. 3B, modifications to the elongated fan case 54 are depicted. These modifications rely on the introduction of a composite fan case containment hook 20. Embodiments of the composite fan case containment hook are shown in FIGS. 4-8. When the composite fan case containment hook 20 is included, the associated modifications reduce weight but retain fan blade 36 containment characteristics. Inclusion of the composite fan case containment hook 20 allows for the composite fan case 26 to be shortened axially according to the depiction in FIG. 3B. Further, presence of the containment hook 20 allows for removal of the debris fence 44. Finally, including the containment hook 20 allows for removal of the forward acoustic panel 48 in the space occupied by the containment hook 20, thereby reducing weight and adding strength as compared to the chamfered design of the forward acoustic panel.

The shortening of the composite fan case 26 occurs in the pre-ramp and fan track liner 42 portion of the case 26. Therefore, weight reduction may result from removal of materials from a portion of the pre-ramp composite fan case barrel 52. Further, weight reduction may result from removal of the portion of fan track liner 42 displaced during shortening. For example, approximately 50 millimeters of axial length of fan track liner 42 may be removed. Further weight reduction results from removal of the debris fence 44 and a portion of the forward acoustic panel 48 as described above. Finally, more of the forward acoustic panel 48 may be removed where the A1 lip 46 of the fan case 26 is shifted aft. The additional fan containment provided by the containment hook 20 may allow for the fan track liner 42 to be made of composite material having a lighter, albeit less strong, material profile. The weight savings described above may provide an advantage for the composite fan case 26 over heavier metal designs.

Referring now to FIG. 4, one embodiment of the composite fan case containment hook 20 may have a c-channel shape and be inserted between the fan track liner 42 and the forward acoustic panel 48. The containment hook 20 may be manufactured of composite materials. To produce the hook 20, the fan case barrel 52 may be manufactured first. The containment hook 20 may then be manufactured therein. Alternatively, the containment hook 20 may be manufactured separately and inserted into the existing composite fan case 26. Regardless of manufacture, the containment hook 20 is attached to the composite fan case 26. The containment hook 20 may be bonded to the fan case barrel 52 and other components of the fan case 26 such as the forward acoustic panel face sheet 56, the fan track liner 42, and the forward acoustic panel 48. Adhesive bonding, resin bonding, or another suitable method for bonding composite materials may be used.

Protection of the composite fan case barrel 52 is particularly important because the composite fan case barrel 52 is made of lighter composite material. Direct impact by the fan blade 36 against the barrel 52 may result in escape of the fan blade 36 or excessive damage to the barrel 52. Therefore, one purpose of the containment hook may be to prevent the separated fan blade 36 from directly impacting the composite fan case barrel 52.

The containment hook 20 may be made of composite material such as continuous carbon fiber, an epoxy matrix, glass, another suitable composite material, or a mix thereof. An example composite containment hook 20 may be constructed from plies of five-harness carbon fiber weave with total thickness based on 0.287-cured ply thickness (CPT). CPT is the thickness of each layer, or ply, of composite material after is has been compressed during the curing process.

An important consideration is not to mismatch bonding choices for the materials used. The materials selected for the barrel 52 and the containment hook 20 are chosen to effectively bond to one another. The shape of the containment hook 20 allows for a load to be distributed efficiently thereby maintaining strength. The bonding method and location also may affect load transfer by the containment hook 20.

Selected space(s) 58 around the containment hook 20 may be filled with foam fillers. For example, foam filler may not be included in the space 58 inside the c-channel of FIG. 4, but may be included in spaces 58 outside the c-channel. Foam filler assists in manufacturing when the containment hook 20 is fabricated. One advantageous way to fabricate the composite containment hook 20 is to cure the composite fan case barrel 52 without the containment hook 20 and then to remove the barrel 52 from a mandrel on which the barrel 52 is formed. Next, the un-cured material of the composite containment hook 20 is placed against the barrel 52. The foam filler assists in placement of the un-cured containment hook 20 materials within the barrel 52. Finally, both the barrel 52 and containment hook are further cured together. Such a manufacturing process may induce further weight reductions.

All embodiments of the containment hook 20 shown herein are approximately three millimeters thick. Further, each alternate embodiment shown in FIGS. 5-8 becomes weight neutral at approximately ten millimeters thickness. The embodiment shown in FIG. 4 is an exception and does not become weight neutral until reaching approximately fourteen millimeters thickness. In some instances, thicknesses of greater than three millimeters may be needed for the containment hook 20 described to withstand expected loads. For a particular embodiment, the containment hook 20 may weigh between 2.5 and 5.5 lbs. and produce a net weight reduction between 17 and 14 lbs.

The location of the containment hook 20 takes into account multiple factors. In order to maintain reductions in weight, the containment hook 20 may not be strong enough to withstand direct radial impact from the separated fan blade 36. Therefore, the location of the containment hook 20 is selected to be forward of the fan blade leading edge 64, thereby avoiding direct radial force from impact during a fan blade off event. Further, the containment hook 20 is forward enough of the fan blade leading edge 64 to contain forward motion of the separated fan blade 36 during a fan blade off event. Similarly, the containment hook 20 is far enough aft that the fan case 26 is sufficiently shortened to achieve weight reduction. Further, the shape and location of the containment hook 20 assist in controlling where the separated fan blade comes to rest after it is trapped between the fan track liner 42 and the composite barrel 52.

Referring still to FIG. 4, an example embodiment of the containment hook having the c-channel shape is shown. The forward acoustic panel 48 is shortened in this embodiment to accommodate addition of the hook 20. Adhesive bonds are formed at an interface 60 between the containment hook 20 and the fan case barrel 52 as well as at an interface 62 between the containment hook 20 and the forward acoustic panel face sheet 56. The arrow shown within the body of the c-channel hook 20 illustrates the load transfer developed thereby.

The c-channel shaped hook 20 of FIG. 4 is configured to provide full surface protection for the fan case barrel 52 such that no portion thereof is exposed to direct impact from the separated fan blade 36 during a fan blade off event. The overall shape of the c-channel hook 20 as it is bonded to the composite barrel 52 forms a hook shape. Further, the c-channel shape, particularly the bottom of the hook 20 bonded to the face sheet 56 in a position nearly flush with the bottom of the fan track liner 42, aids in capturing the fan blade 36 between the fan track liner 42 and the barrel 52.

Referring now to FIG. 5, an alternate embodiment of the containment hook 20 is shown as having a shelf-shaped hook shape. In this embodiment, filler is not included between the hook 20 and the fan case barrel 52, but may be located between the containment hook 20 and the forward acoustic panel face sheet 56 to aid in forming the shape of the composite containment hook 20 during the curing process. Adhesive bonds are formed at two interfaces 60 between the containment hook 20 and the barrel 52 as well as at one interface 62 between the containment hook 20 and the forward acoustic panel face sheet 56.

The number and location of the bonds, as seen in FIG. 5, may provide better load transfer to the fan case barrel 52. A first bond at the aft interface 60 creates a hook feature with the barrel 52 while a second bond farther forward improves load transfer to the barrel 52. The arrow shown within the body of the shelf-shaped hook 20 illustrates how a load is transferred to the fan case barrel 52. The angle of the shelf-shaped hook 20 shown is optimized for strength while bending and avoidance of buckling.

Referring now to FIG. 6, an alternate embodiment of the containment hook 20 is shown as having a tee-shaped hook shape. In this embodiment, filler may be included in any of the spaces 58 surrounding the hook 20. Adhesive bonds are formed at two interfaces 60 between the containment hook 20 and the fan case barrel 52 as well as at one interface 62 between the containment hook 20 and the forward acoustic panel face sheet 56. A first bond at the aft interface 60 creates a hook feature with the barrel 52 while a second bond farther forward improves load transfer to the barrel 52. This alternate embodiment may leave some portion of the fan case barrel 52 exposed to impact from the separated fan blade 36. Again, the angle of the tee-shaped hook 20 shown is optimized for strength while bending and avoidance of buckling. Further, the angle of the hook 20 at the first bond at the aft interface 60 may improve load transfer to the fan case barrel 52. Foam filler may be included to aid in forming the shape of the composite containment hook 20 during cure of the containment hook 20.

Referring now to FIG. 7, an alternate embodiment of the containment hook 20 is shown as having a shape that combines the tee and c-channel shapes. In this embodiment, foam may be included to aid in forming the shape of the composite containment hook 20 during cure of the containment hook 20. Adhesive bonds are formed at two interfaces 60 between the containment hook 20 and the fan case barrel 52 as well as at one interface 62 between the containment hook 20 and the forward acoustic panel face sheet 52. A first bond at the aft interface 60 creates a hook feature with the barrel 52 while a second bond farther forward improves load transfer to the barrel 52.

The alternate embodiment of FIG. 7 includes full barrel 52 protection in combination with the load transfer properties provided by two bonds between the containment hook 20 and the fan case barrel 52. Similar to earlier discussed embodiments, the angle of the tee plus c-channel hook 20 shown is optimized for strength while bending and avoidance of buckling. The addition of the c-channel shape to the tee shape may provide improved control over where the separated fan blade 36 is trapped by the hook 20. Reciprocally, addition of the tee shape to the c-channel shape may provide the advantages of strength from two bonds and an optimized angle for load transfer. Again, foam filler may be used to aid in forming the shape of the composite containment hook 20 during the curing process. Foam filler may be located in the space 58 between the containment hook 20 and the barrel 52, or in the space 58 between the containment hook 20 and the forward acoustic panel face sheet 52.

Referring now to FIG. 8, an alternate embodiment of the containment hook 20 is shown as having a candy cane shape. In this embodiment, filler is not included between the hook 20 and the fan case barrel 52, but may be located between the hook 20 and the forward acoustic panel face sheet 56. Adhesive bonds are formed at two interfaces 60 between the containment hook 20 and the barrel 52 as well as at one interface 62 between the containment hook 20 and the forward acoustic panel face sheet 56. A first bond at the aft interface 60 creates a hook feature with the barrel 52 while a second bond further forward improves load transfer to the barrel 52.

The alternate embodiment of FIG. 8 may leave some portion of the fan case barrel 52 exposed to impact from the separated fan blade 36. Again, like the tee shaped and the shelf-shaped containment hook 20 shapes, the angle of the candy cane hook 20 shown is optimized for strength while bending and avoidance of buckling. Further, the angle of the first bond may improve load transfer to the fan case barrel 52. The shape of this embodiment catches the separated fan blade 36 less than previous embodiments. However, the surface of the hook 20 that abuts the fan track liner 42 stops forward motion of the fan blade 36 further aft than previous embodiments, allowing the fan blade 36 less opportunity to bounce free. Embodiments of the containment hook 20 may abut the fan track liner 42 and/or the forward acoustic panel 48.

Referring now to FIG. 9, further alternate embodiments of the containment hook 20 include a square or rectangular shape. Again, foam filler may be included in the spaces 58 between the containment hook 20 and the barrel 52, the forward acoustic panel 48, the fan track liner 42, and the forward acoustic panel face sheet 56. In such alternate embodiments, the containment hook 20 may be bonded to the forward acoustic panel face sheet 56 at interface 62 or to the barrel 52 at interface 60. Further bonds may be located at interface(s) 66 between the containment hook 20 and the forward acoustic panel 48 or the fan track liner 42. In a square or rectangular embodiment, the corners of the containment hook 20 may be sharp or rounded. The continuous profile of the square or rectangular containment hook 20 may provide added strength or ease in manufacturing. Further, the continuous profile of the square or rectangular containment hook 20 shape may provide improved load transfer to the barrel 52.

The embodiment(s) detailed above may be combined in full or in part, with any alternative embodiment(s) described.

INDUSTRIAL APPLICABILITY

In summary, the present disclosure contemplates a composite fan blade containment hook that is manufactured separately from a composite fan case. The bonding of the containment hook with the composite fan case barrel creates a hook apparatus. Additional adjustments to the shape of the hook provide load transfer from the interior of the fan case to the composite fan case barrel. The location of the bonds between the containment hook and the fan case barrel assist in dispersion of the transferred load. All these features together allow for the shortening of composite fan cases to such a degree that significant weight savings are realized. The present disclosure contemplates embodiments that offer varying degrees of strength, containment, and weight reduction properties while adhering to the general principles of the design disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A fan blade containment apparatus for turbofan engines, comprising:
   a fan case barrel;
   a fan track liner extending in an axial direction away from the fan blade; and
   a containment hook attached to the fan case barrel by a first bond at an aft location and a second bond at a forward location, where the containment hook abuts the fan track liner, and the containment hook and the fan case barrel are formed from composite materials,
   wherein the containment hook contains forward motion of a fan blade during a fan blade off event after the fan blade is trapped between the fan track liner and the fan case barrel; and
   a forward acoustic panel abutting the containment hook and extending forward from the containment hook in the axial direction.

2. The fan blade containment apparatus of claim 1, wherein the containment hook is bonded to the fan case barrel to form an overall hook shape; and
   wherein the containment hook and the fan case barrel are configured to contain within the fan blade containment apparatus both forward axial motion and radial motion of the fan blade during the fan blade off event.

3. The fan blade containment apparatus of claim 2, wherein the containment hook and the fan case barrel are manufactured separately such that the containment hook is inserted into the fan case barrel.

4. The fan blade containment apparatus of claim 2, wherein the fan case barrel is manufactured first; and
   wherein the containment hook is subsequently manufactured within the fan case barrel.

5. The fan blade containment apparatus of claim 1, wherein the first bond at the aft location is placed such that the containment hook and the fan case barrel form an overall hook shape; and
   wherein the second bond in the forward location spreads the load transfer across the fan case barrel.

6. The fan blade containment apparatus of claim 1, wherein the composite material forming the containment hook and the fan case barrel is at least one of continuous carbon fiber, an epoxy matrix, and glass.

7. The fan blade containment apparatus of claim 1, wherein the containment hook has at least one of a c-channel shape, a tee shape; shelf shape, a candy cane shape, a square shape, and a rectangular shape.

8. The fan blade containment apparatus of claim 7, wherein the containment hook at least has the c-channel shape; and
   wherein the containment hook is bonded to the fan case barrel at an aft location and a forward location such that the c-channel shape traps the fan blade at the aft bond location and the forward bond location assists in load transfer to the fan case barrel during the fan blade off event.

9. The fan blade containment apparatus of claim 1, further comprising:
   a forward acoustic panel face sheet, wherein the containment hook abuts the forward acoustic panel; and
   wherein the containment hook is attached to the forward acoustic panel face sheet by a third bond.

10. A system for fan blade containment for turbofan engines, comprising:
    a containment hook, a fan case barrel surrounding a plurality of fan blades, and a fan track liner extending in an axial direction away from the fan blades, the containment hook and the fan case barrel formed from composite materials, wherein the containment hook is attached to the fan case barrel by a first bond at an aft location and a second bond at a forward location, where the containment hook abuts the fan case barrel such that the containment hook contains forward axial motion and radial motion of a fan blade during a fan blade off event.

11. The system for fan blade containment of claim 10, wherein the containment hook traps the fan blade between the fan track liner and the fan case barrel during the fan blade off event.

12. The system for fan blade containment of claim 11, wherein the containment hook and the fan case barrel are manufactured separately such that the containment hook is inserted into the fan case barrel.

13. The system for fan blade containment of claim 12, wherein the fan case barrel is manufactured first; and wherein the containment hook is subsequently manufactured within the fan case barrel.

14. The system for fan blade containment of claim 10, wherein the containment hook has at least one of a c-channel shape, a tee shape; shelf shape, a candy cane shape, a square shape, and a rectangular shape.

15. The system for fan blade containment of claim 10, wherein the composite material forming the containment hook and the fan case barrel is at least one of continuous carbon fiber, an epoxy matrix, and glass.

16. The system for fan blade containment of claim 10, further comprising:
a forward acoustic panel; and
a forward acoustic panel face sheet, wherein the containment hook abuts the forward acoustic panel and the containment hook abuts the fan track liner; and
wherein the containment hook is attached to the forward acoustic panel face sheet by a third bond.

* * * * *